Patented Aug. 11, 1931

1,818,903

UNITED STATES PATENT OFFICE

RICHARD H. MARTIN, OF WORCESTER, MASSACHUSETTS, ASSIGNOR TO NORTON COMPANY, OF WORCESTER, MASSACHUSETTS, A CORPORATION OF MASSACHUSETTS

REFRACTORY ARTICLE AND COMPOSITION FOR AND METHOD OF MAKING SAME

No Drawing. Application filed July 31, 1925. Serial No. 47,374.

This invention relates to refractories and more particularly to a refractory article having a protective coating thereover, as well as to a method of coating and protecting such an article.

Certain refractory articles, such as bricks, saggers, and muffles, are made of grains of a refractory material, such as crystalline alumina, bonded by ceramic materials vitrified to a vitreous or porcelainic condition, or in the case of silicon carbide, by a recrystallization process which unites the crystals into a rigid structure. When such articles are used under certain conditions, such for example, as in an oil-fired furnace, the refractory articles are exposed to the action of the furnace gases which often contain alkaline vapors. The alkaline vapors readily attack the ceramic bond of the refractory article and cause the same to deteriorate rapidly.

Furthermore, it has been found that a refractory article made of silicon carbide tends to decompose when subjected to a high temperature in an oxidizing atmosphere, so that if the article is used as a sagger to hold white ware to be fired, or is otherwise in proximity thereto, discoloration of such ware will result. This decomposition causes the formation of a slag coating or glaze of low refractoriness upon the silicon carbide article, which temporarily protects the article but during firing runs off permitting further decomposition and slag formation. This weakens the structure of the article and shortens its life of active service.

It is an object of the invention to overcome such difficulties, and provide an improved refractory article which will not be subject to undue deterioration and which will have highly refractory properties and be capable of withstanding high temperatures throughout its useful life.

A further object is to provide a composition which may be employed as a protective coating for such articles, and particularly, to provide a method of coating such articles, so they may become more immune to the destructive action of the furnace gases.

In accordance with the invention I have found that a refractory body may be protected by a coating composed either wholly or in part of a highly refractory oxide, such as zirconia. I have found that such a coating effectively protects such articles, is not affected by the furnace gases and is capable of resisting the heat treatment to which the article may be subjected. The refractory oxide may be used alone as a coating for the refractory body or may be combined with other suitable materials for bonding or holding the refractory oxide particles in the coating. The refractory oxide particles when brought to a suitable finely divided condition tend to bond themselves together under normal ceramic operating conditions and with the article to be protected. It is often preferable, however, to supplement such bonding action by mixing other materials, such as a fusible constituent, to the refractory oxide which co-act therewith in some manner to bond or hold the same in the coating. Such other materials may include various ceramic bonding ingredients, such as the non-refractory silica in a suitable form, or one or more other suitable refractory oxides such as magnesia, which may be present either wholly or in part as impurities or may be separately added thereto.

As one method of coating and thereby protecting a refractory article in accordance with the invention, a layer of the coating material containing a refractory oxide either wholly or in part, previously thoroughly mixed with water to the desired plasticity, may be applied thereon to a suitable thickness depending upon the use to which the article is to be subjected. The article as thus made is then dried, and if desired may be used in this form, in which case the first firing operation serves to unite the refractory oxide particles into a coating; but preferably the article is fired initially under an appropriate heat treatment to form the protective layer on the article.

Preferably the refractory oxide or coating mixture is brought to a finely divided condition which assists the mechanical bonding action of the refractory particles to form the coating. It is feasible, as well as readily understood, that the coating mixture may be applied upon the surface of the article before the article has been fired.

In certain instances, temporary bonding materials such as dextrine, gum, glue, resin or other binders may be employed to facilitate the bonding of the refractory oxide particles together and to the refractory article. These materials burn out during the subsequent firing operation and leave only the refractory oxide coating.

As a specific example of a refractory coating capable of protecting a refractory body, such as a muffle, made of crystalline alumina granules bonded into a porous mass by a vitrified ceramic bond, I may employ a coating composition prepared by mixing 21% by weight of magnesia, having a grain size of 150F (150 meshes to the linear inch and finer) with 79% by weight of very finely divided zirkite cement (impure zirconium oxide) whose particles are such as to resemble colloids both in size and properties. The refractory mixture may then be made into a slip by the addition of an appropriate amount of water to form a liquid mixture of about the consistency of cream, and painted on the refractory article. The article, thus covered, is fired at about Orton cone 16 to form a relatively dense coating thereon which is substantially impervious to kiln gases under normal operating conditions.

The zirkite cement employed in the above coating composition is an impure zirconium oxide ($ZrO_2$) having substantially the following composition:

| | |
|---|---|
| $SiO_2$ | 20.8 % |
| $Al_2O_3$ | 2.01% |
| $Fe_2O_3$ | 3.86% |
| $TiO_2$ | 0.82% |
| $ZrO_2$ | 70.9 % |
| CaO | 0.10% |
| MgO | Trace. |
| Loss on ignition | 2.17% |

As the result of firing such a mixture, there is produced a dense coating which probably contains compounds of magnesia, zirconia, and silica, and the fusible constituents of the mixture serve to bond the other ingredients and hold them in place on the refractory body beneath.

The protective coating of the invention containing a refractory oxide, such as zirconium oxide, serves as a surface layer which is in itself resistant to decomposition by the furnace gases and is insoluble in any alkaline vapors which may be present therein, and adequately protects the body of the refractory article beneath. The coated article of the invention is more serviceable for various uses than the ordinary refractory article, since the coated article has all the desirable attributes of a bonded refractory article while at the same time being immune to the destructive action of the furnace gases, in as much as the protective layer is substantially impervious to the furnace gases. The provisions of the invention are particularly advantageous for protecting refractory articles composed of crystalline alumina united by a ceramic bond since such a bond is particularly subject to deterioration by the action of the alkaline vapors in furnace gases. Furthermore, it will be readily apparent to one skilled in the art, that the provisions of the invention are advantageous for protecting a silicon carbide refractory article which is subject to decomposition when subjected to oxidizing influences under high temperature.

While the invention has been specifically illustrated by describing one suitable method of applying a specific coating composition, namely, one composed principally of zirconium oxide and containing magnesia, upon a refractory article made of crystalline alumina bonded with a ceramic bond, nevertheless, various equivalent coating compositions will be readily apparent to those skilled in the art, as well as the fact, that such coating compositions are suitably adapted for effectively protecting refractory articles of various compositions manufactured in accordance with the usual customary practices.

This application contains subject matter in common with my Reissue Patent No. 17,661, granted May 13, 1930.

Having thus described my invention, what I claim as new and desire to secure by Letters Patent is:

1. A refractory article comprising a body of bonded, refractory, granular material and a relatively thin coating thereon containing a major proportion of a zirconium compound and a fusible constituent.

2. A refractory article comprising a body of ceramic bonded crystalline alumina grains and a relatively thin coating thereon containing as its largest ingredient a zirconium compound.

3. A refractory article comprising a body of bonded, granular, refractory material and a relatively thin coating thereon which resists alkaline vapors, formed by firing in situ a mixture comprising magnesia and zirconia, the latter being the largest ingredient of the mixture.

4. A refractory body comprising ceramic bonded, refractory, granular material and a relatively thin coating thereon containing a predominating amount of zirconia and a smaller amount of magnesia with associated impurities fired in situ to form a relatively dense coating which is substantially impervious to kiln gases under normal firing conditions.

5. A refractory article comprising a body of ceramic bonded, crystalline alumina grains and a relatively thin coating thereon capable of resisting alkaline vapors which contains a major proportion of zirconia and bonding ingredients fired in situ.

6. A refractory article comprising a body of bonded, granular, refractory material and a relatively thin coating thereon containing over 50% of zirconia and a smaller amount of a bonding ingredient capable of uniting therewith and of forming a dense coating which resists penetration of alkaline vapors to the refractory body beneath.

7. A refractory article comprising a body of bonded, refractory, granular material and a relatively thin coating thereon fired in situ, which has a large proportion of both magnesia and zirconia and a smaller amount of silica and associated impurities, the zirconia being the largest ingredient.

8. A refractory article comprising a body of ceramic bonded crystalline alumina having a relatively thin coating thereon containing a predominating proportion of a compound formed by firing in situ magnesia, zirconia and a fusible material, the zirconia being the largest ingredient.

9. A refractory article comprising a body of ceramic bonded crystalline alumina granules and a relatively thin protective coating thereon containing compounds formed by firing magnesia, zirconia and associated impurities including silica at a sufficiently high temperature to form a dense coating thereof, the zirconium compound forming the major portion of the coating.

10. A refractory article comprising a body of ceramic bonded refractory granular material and a relatively thin protective coating thereon which is refractory to alkaline vapors, formed by firing in situ a composition containing a bond and of which a zirconium compound is the largest ingredient.

Signed at Worcester, Massachusetts, this 30th day of July, 1925.

RICHARD H. MARTIN.